(12) United States Patent
Shen et al.

(10) Patent No.: US 11,144,649 B2
(45) Date of Patent: Oct. 12, 2021

(54) SENSITIVE INFORMATION PROVISION PROCESS

(71) Applicants: Kigen (UK) Limited, Cambridge (GB); Altair Semiconductor Ltd, Hod Hasharon (IL)

(72) Inventors: Asaf Shen, Irvine, CA (US); Patrick Biget, Versailles (FR); Avishay Sharaga, Beit Nehemya (IL); Omer Botvinik, Herzliya (IL)

(73) Assignees: Kigen (UK) Limited, Cambridge (GB); Altair Semiconductor Ltd, Hod Hasharon (IL)

( * ) Notice: Subject to any disclaimer, the term of this patent is extended or adjusted under 35 U.S.C. 154(b) by 329 days.

(21) Appl. No.: 16/238,057

(22) Filed: Jan. 2, 2019

(65) Prior Publication Data

US 2019/0228164 A1    Jul. 25, 2019

(30) Foreign Application Priority Data

Jan. 25, 2018  (EP) .................................... 18305061

(51) Int. Cl.
*G06F 21/60*   (2013.01)
*H04L 9/32*    (2006.01)
(Continued)

(52) U.S. Cl.
CPC ............ *G06F 21/602* (2013.01); *G06F 21/72* (2013.01); *G09C 1/00* (2013.01); *H04L 9/0631* (2013.01);
(Continued)

(58) Field of Classification Search
CPC ........ G06F 21/602; G06F 21/72; G06F 21/60; G09C 1/00; H04L 9/0631; H04L 9/0866;
(Continued)

(56) References Cited

U.S. PATENT DOCUMENTS

2008/0279373 A1* 11/2008 Erhart .................. H04L 9/3278
                                                            380/46
2010/0284539 A1* 11/2010 Roy .................. H03K 19/17768
                                                            380/278
(Continued)

FOREIGN PATENT DOCUMENTS

WO      2014/105146       7/2014
WO      WO-2014105146 A1 *  7/2014 ........... H04L 9/0866

OTHER PUBLICATIONS

Office Action for EP Application No. 19150320.0 dated Nov. 26, 2020, 6 pages.
(Continued)

*Primary Examiner* — Jayesh M Jhaveri
(74) *Attorney, Agent, or Firm* — Nixon & Vanderhye P.C.

(57) ABSTRACT

A method for exporting sensitive information an integrated circuit, the method comprising: fabricating an integrated circuit, the integrated circuit having a register-transfer level "RTL" key fabricated in the integrated circuit, wherein the RTL key is a pre-determined cryptographic key; signing the sensitive information using the RTL key using a signature; and exporting the signed sensitive information and the signature for validation.

14 Claims, 4 Drawing Sheets

(51) Int. Cl.
H04L 9/08 (2006.01)
H04L 9/14 (2006.01)
G06F 21/72 (2013.01)
H04L 9/06 (2006.01)
H04L 9/30 (2006.01)
G09C 1/00 (2006.01)

(52) U.S. Cl.
CPC .............. *H04L 9/0866* (2013.01); *H04L 9/14* (2013.01); *H04L 9/3073* (2013.01); *H04L 9/3247* (2013.01); *H04L 9/3268* (2013.01); *H04L 9/3278* (2013.01); *H04L 2209/12* (2013.01)

(58) Field of Classification Search
CPC ....... H04L 9/14; H04L 9/3073; H04L 9/3247; H04L 9/3268; H04L 9/3278; H04L 2209/12; H04L 9/32; H04L 9/06; H04L 9/08
See application file for complete search history.

(56) References Cited

U.S. PATENT DOCUMENTS

| | | | |
|---|---|---|---|
| 2014/0093074 A1* | 4/2014 | Gotze | H04L 9/3278 380/45 |
| 2014/0189365 A1* | 7/2014 | Cox | H04L 9/0866 713/189 |
| 2014/0189890 A1* | 7/2014 | Koeberl | H04L 9/0866 726/34 |
| 2014/0205092 A1* | 7/2014 | Hartley | H04L 9/0897 380/44 |
| 2017/0039352 A1* | 2/2017 | Volkening | H04L 9/3247 |
| 2018/0102908 A1* | 4/2018 | Narendra | H03K 19/20 |

OTHER PUBLICATIONS

European Extended Search Report for EP Application No. 18305061.6 dated Aug. 1, 2018, 15 pages.

* cited by examiner

SENSITIVE INFORMATION PROVISION PROCESS

This application claims priority to EP 18305061.6 filed Jan. 25, 2018, the entire contents of each of which is hereby incorporated by reference.

The present application relates to a mechanism for providing sensitive, device-specific information, such as a cryptographic key, from an integrated circuit in a secure manner, which has example application for integrated universal integrated-circuit card (iUICC) technologies.

Cellular communication devices make use of universal integrated-circuit cards (UICCs) that enable software to run that manages and uses network, device, and user profile information to enable a user of the device to register with and communicate using an appropriate network.

As cellular communication devices decrease in footprint, there is a drive to reduce the physical size of the UICC within the device. In addition, it is typical for users of cellular communication devices to change the service provider that the user is subscribed with so as to access a network during the lifetime of the device, which has traditionally meant a physical replacement of the UICC in the device with a new UICC that has the new information for the changed service provider.

With the advent of embedded UICC (eUICC) technology, a separate hardware element located within and secured to the cellular communication device is provided upon which different profiles can be loaded. In many cases, the eUICC takes the form of a non-detachable discrete component or integrated circuit on a printed circuit board of the device, thereby enabling an effective "soft-update" of the profile information without any physical removal of a hardware element of the device.

A further iteration of this technology involves the replacement of traditional UICCs with integrated UICCs (iUICCs), in which the hardware elements of a UICC are manufactured integrally within an integrated circuit along with other functionality (e.g. the cellular modem), typically within a system-on-chip (SoC). Traditional UICCs typically include a CPU, memory, and I/O circuitry sufficient to perform the required operations of a SIM card. In an iUICC, these hardware elements are built into a larger integrated circuit (rather than being a separate hardware element, i.e. a detachable UICC or one that is soldered to a printed circuit board "PCB"), that might include radio modem hardware and a larger CPU configured to perform other functions.

Since an iUICC is manufactured as part of a larger SoC, control over the manufacturing process may be lost by the provider of the iUICC technology. Accordingly, there is a need to secure the manufacturing process and to ensure any security provisions within the iUICC are not compromised. As the device production flow is changed when implementing an iUICC, the dedicated eUICCs produced in a separate factory are no longer required.

A method is provided for exporting sensitive information from an integrated circuit. The method comprises: fabricating an integrated circuit, the integrated circuit having a register-transfer level "RTL" key fabricated in the integrated circuit, wherein the RTL key is a pre-determined cryptographic key; signing the sensitive information using the RTL key using a signature; and exporting the signed sensitive information and the signature for validation.

The sensitive information may be device-specific sensitive information. The sensitive information may comprise at least two public keys each of a respective key pair of the integrated circuit to be exported for validation, wherein the integrated circuit comprises a hardware key generation value fabricated in the integrated circuit used to generate at least two cryptographic key pairs each comprising a public key and a private key, and wherein the method further comprises: generating at least two cryptographic key pairs, each pair comprising a public key and a private key using the hardware key generation value.

The RTL key may be a predetermined cryptographic key unique to a hardware description language definition of the integrated circuit.

The integrated circuit may comprise an integrated universal integrated circuit card (iUICC) and wherein the at least two signed public keys of the integrated circuit are exported to enable secure personalisation of the iUICC. The RTL key may be an AES key. The hardware key generation value may have been generated from a strong entropy source. The entropy source may be at least one of a Physical Unclonable Function "PUF" or a True Random Number Generation "TRNG" seed. The at least two public keys may be signed by the RTL key using AES-CMAC.

The method may further comprise providing the RTL key to enable the signed public key to be validated.

The at least two cryptographic key pairs may comprise a first cryptographic key pair and a second cryptographic key pair, the first key pair for authentication and the second key pair for encryption.

An integrated circuit comprises, in hardware: a register-transfer level "RTL" key, wherein the RTL key is a pre-determined cryptographic key fabricated in the integrated circuit; and wherein the integrated circuit is configured to sign sensitive information using a signature based on the RTL key.

The sensitive information may be device-specific sensitive information. The sensitive information may comprise at least two public keys each of a respective key pair of the integrated circuit to be exported for validation, wherein the integrated circuit comprises a hardware key generation value fabricated in the integrated circuit used to generate at least two cryptographic key pairs, each pair comprising a public key and a private key, and wherein the integrated circuit is configured to: generate at least two cryptographic key pairs using the hardware key generation value and to sign the generated public keys of the key pairs using the RTL key.

The RTL key may be a predetermined cryptographic key unique to a hardware description language definition of the integrated circuit. The integrated circuit comprises an integrated universal integrated circuit card (iUICC) and wherein the integrated circuit is configured to export the signed public keys to enable secure provision of personalisation data to the iUICC.

The RTL key may be an AES key. The hardware key generation value may have been generated from an entropy source. The entropy source may be at least one of a Physical Unclonable Function "PUF" or a True Random Number Generation "TRNG" seed. The public key may be signed by the RTL key using AES-CMAC.

A method is provided for validating at least two public keys exported of an integrated circuit. The method comprises: receiving at least two signed public keys of a respective key pair exported from the integrated circuit, each public key signed using a register-transfer level "RTL" key which is a pre-determined cryptographic key fabricated in the integrated circuit, and wherein the public keys are a public key of a respective key pair generated from a hardware key generation value fabricated in the integrated circuit; validating the signed public keys using the RTL key; and storing the validated public keys to enable validation.

The RTL key may be a predetermined cryptographic key unique to a hardware description language definition of the integrated circuit. The integrated circuit may comprise an integrated universal integrated circuit card (iUICC) and wherein the integrated signed public key of the integrated circuit may be exported to enable secure personalisation of the iUICC. The RTL key may be an AES key. The hardware key generation value may have been generated from an entropy source. The entropy source may be at least one of a Physical Unclonable Function "PUF" or a True Random Number Generation "TRNG" seed. The public key may be signed by the RTL key using AES-CMAC.

A method is provided for providing sensitive information from a transmitting entity to an electronic device. The method comprises: receiving from an electronic device a certificate of the transmitting entity signed by an authentication private key of the electronic device, and an authentication public key of the electronic device; verifying the received authentication public key of the electronic device by comparing the received authentication public key to a list of valid authentication public keys, and using the verified authentication public key to validate the certificate; in response to validating the certificate, signing sensitive information to be transmitted to the electronic device using an authentication private key of the transmitting entity to generate a signature; encrypting the signature and the sensitive information with a public encryption key of the electronic device; and transmitting the encrypted signature and sensitive information to the electronic device.

A method is provided for obtaining sensitive information at an electronic device from a transmitting entity. The method comprises: transmitting from the electronic device an authentication public key of the electronic device and a certificate of the transmitting entity signed by an authentication private key of the electronic device; receiving from the transmitting entity an encrypted signature and sensitive information, wherein the encrypted signature is a signature of the sensitive information signed using an authentication private key of the transmitting entity and is encrypted with the public encryption key of the electronic device; decrypting the encrypted signature and the sensitive information using the private encryption key of the electronic device; verifying the signature using a transmitting entity certificate stored in the electronic device; and in response to verification of the signature, storing the sensitive information in the electronic device.

The methods above may be implemented in an apparatus, as computer code, or as computer-readable instructions in a transitory or non-transitory computer readable medium.

Examples of the disclosure will be described with reference to the appended drawings in which.

Figure 5:
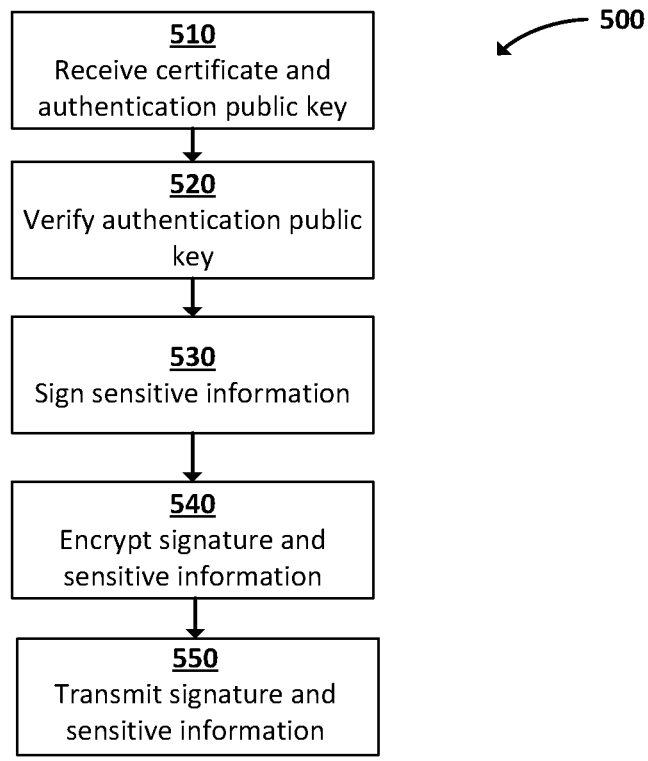
Figure 6:
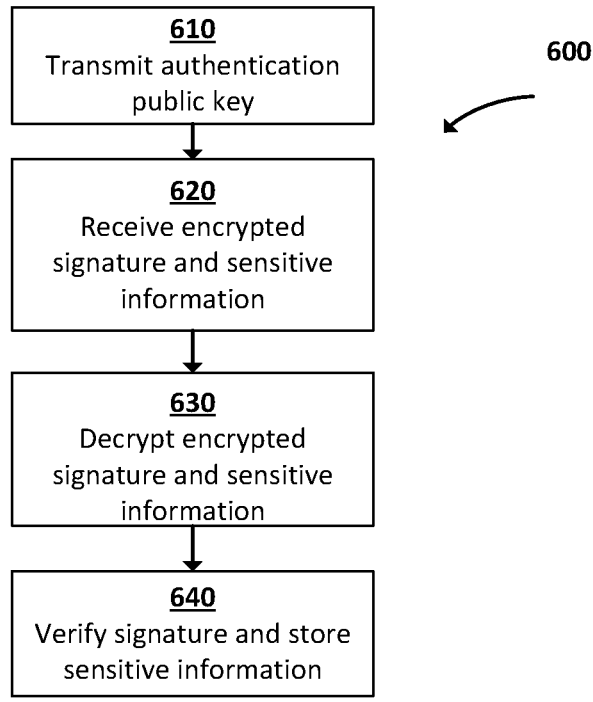

FIG. 5 an example method for providing sensitive information to an electronic device; and FIG. 6 an example method for obtaining sensitive information at an electronic device from a transmitting entity.

The present application relates to the use of an internal hardware cryptographic key (referred to herein as an RTL key) that is fabricated in an integrated circuit during a silicon manufacturing process to attest to the authenticity of device-specific sensitive data of an electronic device, since the device-specific sensitive data can be signed by the RTL key.

In an example, the device-specific sensitive data may be two or more unique public keys of the electronic device, where the two or more public keys are respective public keys of a key pair comprising a public and a private key. The device-specific sensitive data (such as the public keys) is signed and sent externally where it is check and get registered in a database. At least one of the device unique public keys (an encryption public key) will be used to encrypt device specific information in a protected manner for transmission to the electronic device, so only the specific device can decipher it. The other device unique public key (an authentication public key) can be used to validate data signed using the corresponding private key of the electronic device.

Where the device-specific sensitive data that is signed using the RTL key for validation is at least two public keys of the electronic device, the use of the RTL key to sign the public keys assures that an emulation cannot pretend to be a real integrated circuit as it won't have access to that RTL key. The RTL key allows the device unique keys to be trusted and effectively remove the need to have a trusted physical environment for introduction of sensitive information. The sensitive information may be sensitive information related to personalization of a UICC (such as an operator's personalization information). The sensitive information can be transmitted over any media, as long as it is protected by the device unique keys, which in turn are trusted due to that RTL key.

The examples described below illustrate an arrangement where device-specific sensitive data comprises at least two public keys. However, it will be appreciated that the device-specific sensitive data to be signed by the RTL key can take any form.

Although this technique is applicable in different technical areas, this technique has particular application in the field of integrated universal integrated-circuit cards (iUICCs) or integrated subscriber identity modules (iSIMs). The evolution of an iSIM has brought a unique set of advantages, including cost saving. However, iUICCs introduce a new challenge related to the initial personalisation of data onto a device, i.e. the introduction of user profile information to a iUICC. Telecom operators mandate that this personalisation is done in a High Security Area (HSA) that must be audited and accredited by a regulatory body such as the GSMA. For the iUICC, this personalisation does not occur on a separate chip, and must be done during the device manufacturing process in a device manufacturer facility.

However, device manufacturing facilities do not necessarily meet the security criteria of the GSMA. The following techniques enable the initial personalisation of an iUICC to take place.

Traditional universal integrated-circuit cards (UICCs) are separate physical devices that are typically inserted or removably attached to a cellular communications device. UICCs store profile information that can be used to register the cellular communications device to a cellular communication network. UICCs have practical drawbacks in that they often only have sufficient hardware capability to store a single profile. This results in a need to replace the UICC with a new UICC when the user wishes to use different profile information, for example when the user signs up to a new service contract with a different service provider.

As a development to traditional UICCs, embedded universal integrated-circuit cards (eUICCs) have been developed to enable additional or replacement profile information to be registered to a communications device without having to physically replace a hardware element of the communications device. An eUICC is a separate hardware component, usually in the form of a discrete integrated circuit, located within and secured to the communication device upon which a different profile can be loaded, thereby enabling an effective "soft-update" of the profile information without any physical removal of a hardware element of the device.

Figure 1:
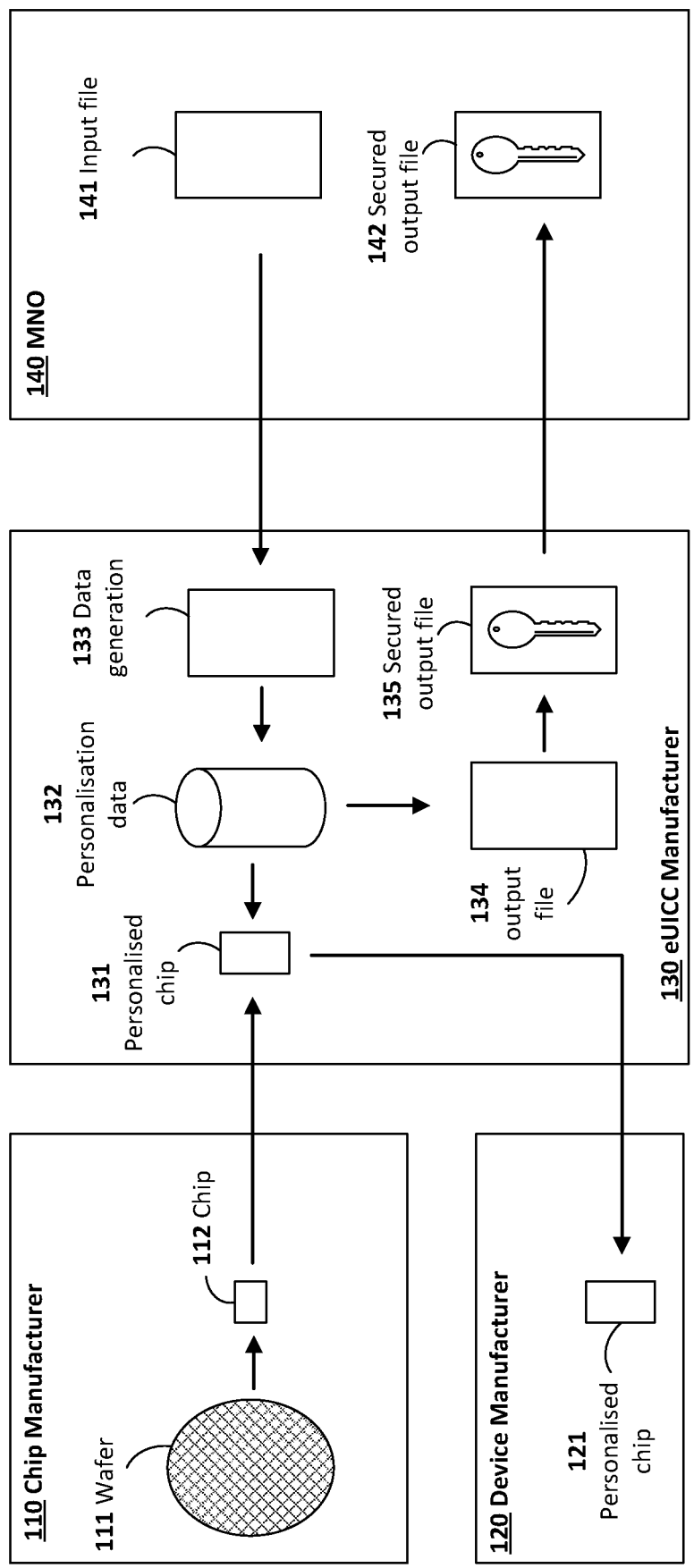
FIG. 1 illustrates an example process for personalisation of an eUICC.

FIG. 1 illustrates an example of personalisation of an eUICC. As illustrated in FIG. 1, chip manufacturer 110 manufactures integrated circuits on a silicon wafer 111 comprising a plurality of integrated circuits, or chips, 112. The integrated circuits 112 are passed from the chip manufacturer to the eUICC manufacturer 130 which is configured to perform a personalisation operation on the chip. For example, in the arrangement of FIG. 1, a mobile network operator (MNO) 140 may be configured to provide some user profile information to the eUICC manufacturer 130. This profile information may take the form of an input file 141 which is provided to the eUICC manufacturer 130. The profile information is provided to a data generation process 133 at which the user profile information is used to generate personalisation data to be loaded onto the eUICC to create a personalised integrated circuit or chip 131 which can be installed within a device. The personalisation data 132 can be stored in a database at the eUICC manufacturer 130. In addition, an output file 134 reflecting the personalisation data can be generated and returned to the MNO 140 and stored at the MNO 140.

It will be appreciated that the eUICC manufacturer may have the appropriate security measures in place to meet the necessary security requirements for accreditation. However, the device manufacturer or the chip manufacturer may not have the appropriate security measures in place. Accordingly, an iUICC may not have control over the manufacturing process and thus may not be able to physically access the chip before it is implemented into a device. Alternatively, it may be desirable to implement a mechanism by which the personalisation of iUICCs can be performed in a secure manner.

Figure 2:
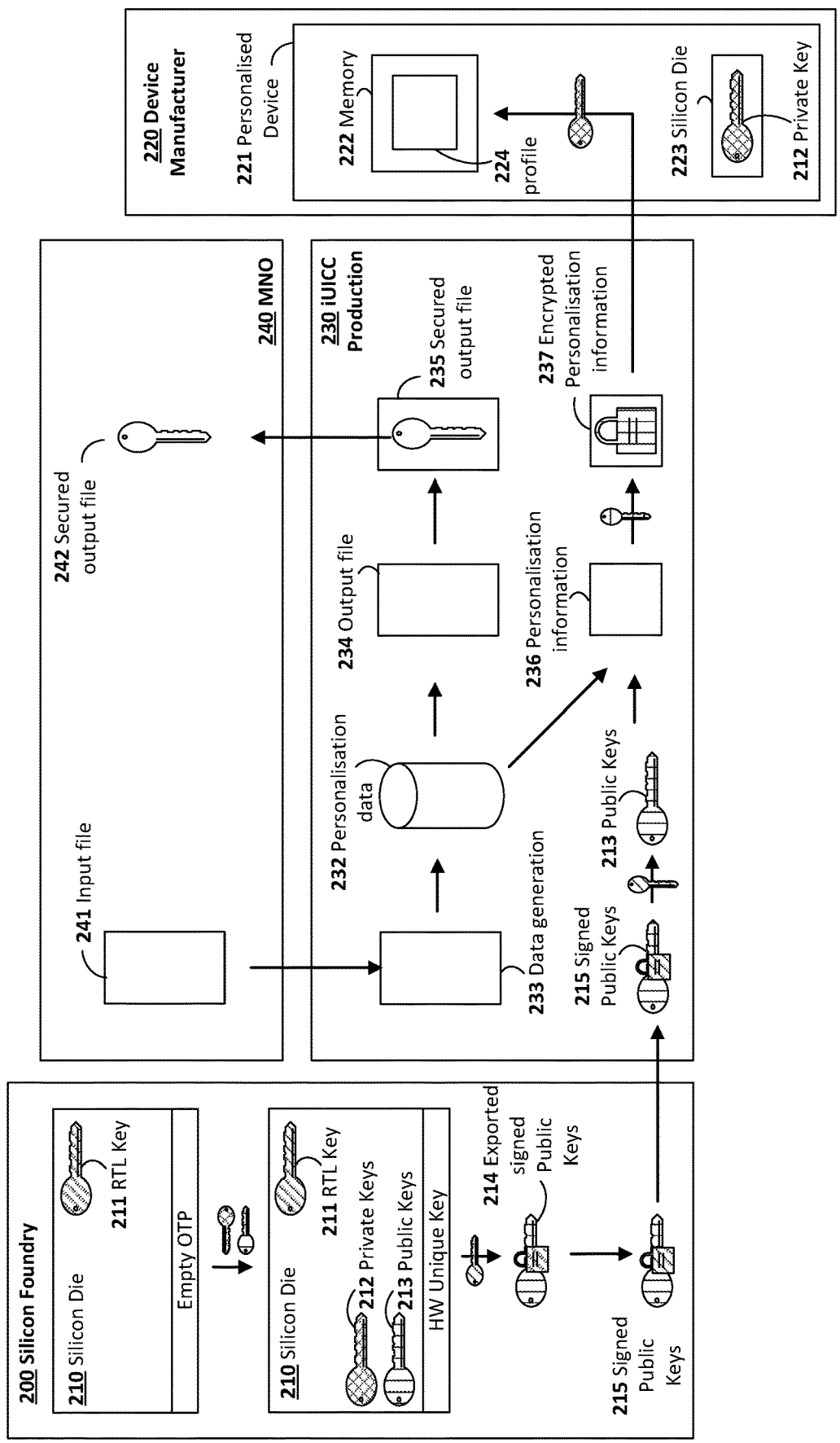
FIG. 2 illustrates an example approach for provisioning an iUICC with personalisation information.

FIG. 2 illustrates an example approach for providing personalisation information to an iUICC in an electronic device in a secure manner.

As illustrated in FIG. 2, a number of different entities are involved in the personalisation process, in accordance with a typical semiconductor fabrication process. One entity is silicon foundry 200 which is a semiconductor fabrication facility that is capable of fabricating integrated circuits (ICs) such as systems-on-chips (SoCs). In the example of FIG. 2, the silicon foundry 200 has been provided with the fabrication information necessary to fabricate ICs by a device manufacturer 220, so that the ICs, once fabricated, can be manufactured into an electronic device. The fabrication information may be in the form of a hardware description language (HDL) language code, such as register-transfer level (RTL) abstracted code, or may be in the form of a synthesizable netlist and/or layout mask used to manufacture the ICs.

In the example of FIG. 2, silicon foundry 200 is provided with RTL code that defines the IC that is to be fabricated. As part of the provided RTL code, an RTL key 211 is defined in the RTL. The RTL key 211 is a cryptographic key having a pre-determined value that is hardcoded into the IC as it is fabricated. Put another way, the RTL key 211 is a pre-defined and fixed cryptographic key that is effectively baked into the device by implementing the cryptographic key value in hardware. For example, the RTL key value may be stored in registers that cannot be written to. In one example, the RTL key 211 may be an AES key, such as an 128 bit AES key. However, other cryptographic techniques may readily be used in place of AES.

During the IC production process, such as wafer sort or packaging stages, a number of steps are taken to generate at least two key pairs as will be described in more detail below.

Inside the IC, two key pairs may be generated from a hardware key generation value that is also defined in hardware, in a similar manner to that RTL key 211. The at least two private keys 212, and the at least two public keys 213 may be elliptic-curve cryptography key pairs, a first pair of which may be used for encryption and the other pair for authentication. The two key pairs may be derived from a persistent hardware unique value which is generated from a true entropy source like Physical Unclonable Functions (PUFs) or a true random number generators (TRNG) seed that is written into one-time programming memory (OTP memories).

One approach for deriving the two key pairs using extra random bits is described in appendix B.4.1 in http://nvl-pubs.nist.gov/nistpubs/FIPS/NIST.FIPS.186-4.pdf, and as set out below.

In this method, 64 more bits are requested from a random bit generator than are needed for d so that bias produced by a mod function in step 6 of the described method is negligible.

The following process or its equivalent may be used to generate an ECC key pair:

Input:
1. (q, FR, a, b {, domain_parameter_seed}, G, n, h)
   The domain parameters that are used for this process, n is a prime number, and G is a point on the elliptic curve.

Output:
1. Status The status returned from the key pair generation procedure. The status will indicate SUCCESS or an ERROR.
2. (d, Q) The generated private and public keys. If an error is encountered during the generation process, invalid values for d and Q should be returned, as represented by Invalid_d and Invalid_Q in the following specification. d is an integer, and Q is an elliptic curve point. The generated private key d is in the range [1, n−1].

Process:
1. N=len(n).
2. If N is invalid, then return an ERROR indication, Invalid_d, and Invalid_Q.
3. requested_security_strength=the security strength associated with N; see SP 800-57, Part 1.
4. Obtain a string of N+64 returned_bits from an RBG with a security strength of requested_security_strength or more. If an ERROR indication is returned, then return an ERROR indication, Invalid_d, and Invalid_Q.
5. Convert returned_bits to the (non-negative) integer c.
6. d=(c mod (n−1))+1.
7. Q=dG.
8. Return SUCCESS, d, and Q.

Having generated the at least two key pairs, the public key 213 of each key pair is to be exported as an exported public key 214 from the IC and provided to a 230 iUICC production facility or "back-office" in a secure manner to enable secure authentication of the public key, thereby ensuring secure personalization of user profile data. To do this, the public key of each key pair is signed using the RTL key 211 to form signed public keys inside the silicon. The public keys 213 may be signed using, for example, AES-CMAC. The skilled person will understand AES-mode for authentication, with further details set out in the following resource, (http://nvlpubs.nist.gov/nistpubs/SpecialPublications/NIST.SP.800-38b.pdf).

As illustrated in FIG. 2, the signed public keys are exported 214 from the IC silicon and provided 215 to the iUICC production facility 230 where it is added to a list of previously exported and authenticated public keys from other ICs. The public key list as validated at the iUICC production facility 230 using knowledge of the RTL key to verify that the public keys are authentic (i.e. that the ICs are authentic ICs). The iUICC production facility 230 therefore has access to the public key for encryption and the public key for authentication, as well as the RTL key 211 that is used to sign the public keys.

The integrated circuit is fabricated to include a number of different functions, and may be a system-on-chip (SoC). The SoC may contain a number of different functions, including one or more of radio circuitry, processing unit, and an iUICC. As mentioned previously, the integrated circuit may be fabricated according to a design implemented in a hardware description language. The hardware description language may include a predefined cryptographic key referred to herein as a register-transfer level key or RTL key. This RTL key is embedded in the hardware of the integrated circuit when it is fabricated. As such the RTL key is effectively hard-coded into the integrated circuit. The RTL key may be a cryptographic key such as an AES key. The RTL key value may be pre-defined only for a subset of integrated circuits that are manufactured. For example, the RTL key may differ between batches or may differ between designs. For example, a design revision or model change for an integrated circuit may trigger a change in the value of the key used as the RTL key.

Also fabricated into the integrated circuit is a hardware-defined value which is used to generate at least two key pairs, one for authentication and another for encryption (i.e. for encrypting information for delivery of information to the integrated circuit).

The iUICC production facility 230 is configured to perform a personalization operation in order to load a user profile on to the iUICC as installed in the electronic device as it is manufactured by a device manufacturer 220.

As an electronic device is manufactured by a device manufacturer 220, a certificate of the iUICC production facility 230 is provided to the electronic device 221. The certificate is a certificate of the iUICC production facility 230 authentication key. For example, the certificate may be introduced to the security hardware in the electronic device.

As with FIG. 1, a mobile network operator (MNO) 240 may provide an input file 241 which can be used to perform a data generation process 233 which provides personalisation data. The personalisation data can be stored 233 and passed to an output file 234 which is secured to form a secured output file 235 which is returned to the mobile network operator (MNO) 240 to form a secured output file 242 at the MNO 240. The personalisation data also must be passed to the electronic device 221 of the device manufacturer 220. The personalization information 236 is encrypted 237 using the authenticated public key of the integrated circuit and passed to the electronic device. The encrypted personalization information 237 is decrypted using the private encryption key 213 of the integrated circuit and the personalization information, typically including user profile data 224, can be stored in memory 222 of the electronic device which has then been personalized 221.

Figure 3:
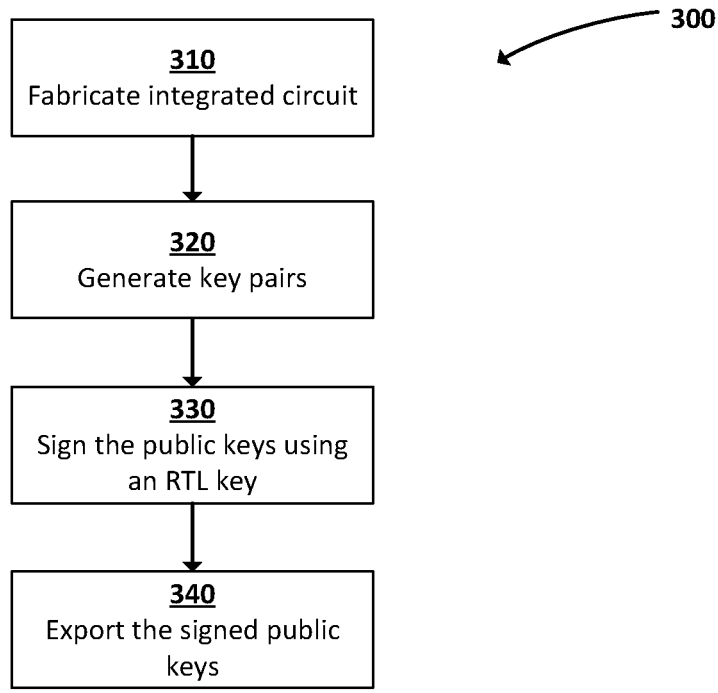
FIG. 3 illustrates an example method for exporting a public key of an integrated circuit for validation.

An example process of providing the at least two public keys to the iUICC production facility 230 is illustrated in FIG. 3. In FIG. 3, the process 300 begins at step 310 at which an integrated circuit is fabricated at step 310. At step 320, a hardware key generation value is used to generate at least two cryptographic key pairs. The hardware key generation value can be used to generate the two key pairs, one for authentication and one for encryption. Having generated the at least two cryptographic key pairs, each pair comprising a public key and a private key, the RTL key is used to sign the generated public keys of each respective key pair in step 330. The signed public keys are then exported to be validated by an external source to ensure that the public keys are not being emulated on another device. For example, the external source may be an iUICC production facility and the integrated circuit may be configured to include an iUICC module.

Figure 4:
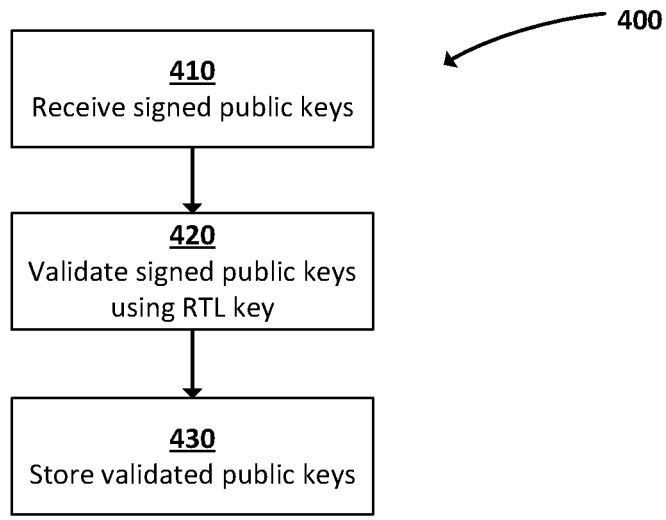
FIG. 4 illustrates an example method for validating a public key exported of an integrated circuit.

FIG. 4 illustrates an example method for validating public keys exported from an integrated circuit. At step 410, at least two signed public keys are received for processing. This may occur, for example, iUICC production facility 230. The received signed public key of each key pair is exported from an integrated circuit and has been signed by an RTL key which is a pre-determined cryptographic key fabricated in the integrated circuit. Since the receiving entity, such as the iUICC production facility 230, has knowledge of the RTL key the receiving entity can validate at step 420 the signed public keys using the RTL key. The validated public keys can then be stored at step 430 and used to ensure that future communication with the device is with the correct physical device, since a rogue device would not be able to emulate the RTL key.

Where sensitive information needs to be sent to the electronic device from the iUICC production facility 230, such as personalization information relating to the iUICC in the IC, a number of steps are taken, as set out below and described in relation to FIGS. 5 and 6. FIG. 5 illustrates the operation of the iUICC production facility 230 in providing sensitive information to an electronic device.

At step 510, the iUICC production facility 230 receives from the electronic device 221 an iUICC production facility certificate. The iUICC production facility certificate may be signed with the private authentication key of the electronic device. An example signing technique uses an Elliptic Curve Digital Signature Algorithm (ECDSA), for example as per a FIPS.186-4 standard. In addition to receiving a certificate, the iUICC production facility 230 is configured to receive from the electronic device 221 the authentication public key of the electronic device.

The iUICC production facility 230 is configured to verify at step 520 that the authentication public key of the electronic device is valid. To do this, the iUICC production facility 230 compares the received authentication public key of the electronic device to the list of authenticated authentication public keys. Since the list of public keys was originally established using RTL keys, it is possible to ensure that the public keys are valid. Once the public keys are determined to be valid (i.e. the integrated circuit is an authentic integrated circuit), the authentication public key of the electronic device is used to validate that the iUICC production facility certificate is also valid. Once this has been completed, the identity of the electronic device is validated and sensitive information can be prepared for transmission to the electronic device.

At step 530 of FIG. 5, the sensitive information is signed for transmission to the electronic device. The signing process is performed using an authentication private key of the transmitting entity, which is the iUICC production facility 230, to generate a signature. The authentication private key may be a counterpart of the public key found in the validated certificate. The sensitive info may be signed with the authentication private key of the production facility according to ECDSA (per FIPS.186-4).

At step 540, the signature for the sensitive information and the sensitive information itself is then encrypted using the public encryption key of the electronic device. The encryption may, for example, take place in accordance with an Integrated Encryption Scheme (IES).

At step 550, the encrypted signature and the encrypted sensitive information is then transmitted from the iUICC production facility to the electronic device.

FIG. 6 illustrates the operation of the electronic device in receiving and storing sensitive information, such as personalisation data for storing in an iUICC implemented in an integrated circuit in the electronic device.

At step 610 of method 600, the electronic device transmits the authentication public key of the electronic device to the iUICC production facility along with a certificate of the iUICC production facility signed by an authentication private key of the electronic device.

At step 620, the electronic device is configured to receive from the iUICC production facility an encrypted signature and encrypted sensitive information. The encrypted signature is a signature of the sensitive information signed using an authentication private key of the iUICC production facility. The encrypted signature is encrypted with the public encryption key of the electronic device.

At step 630, the electronic device is configured to decrypt the encrypted signature and the sensitive information using private encryption key of the electronic device. This decryption may occur, for example, according to integrated Encryption Scheme (IES).

At step 640, the signature received from the iUICC production facility is verified using a iUICC production facility certificate stored in the electronic device and received from the iUICC production facility, for example using Elliptic Curve Digital Signature Algorithm (per FIPS.186-4).

In response to the verification of the signature of the iUICC production facility, the electronic device can ascertain that the data is received from the iUICC production facility and thus can be trusted. The electronic device then proceeds to store the sensitive information in the electronic device. For example, where the sensitive information is iUICC personalisation information, that personalisation information can be stored in the electronic device for use by the iUICC in operation.

The techniques, methods, and system features disclosed herein are described as examples in relation to iUICC modules within an integrated circuit. The skilled person will appreciate that the same techniques, methods, and system features are equally applicable to other applications beyond iUICC modules within an integrated circuit. Thus, reference in this document to iUICC is merely as an example application for the techniques discussed herein.

As will also be appreciated, reference herein to a device or a server should not be interpreted to be limited to a single hardware element. The techniques described herein are applicable to cloud computing techniques in which the operation of a single device or server, or the provision of a single service, may be distributed amongst one or more physical devices or servers. Accordingly, reference herein to a server should include reference to a plurality of servers that are communicatively coupled so as to provide the functionality of the single referred-to server.

The methods described herein can be implemented in hardware or software or any combination of hardware and software. For example, the methods described herein can be implemented as computer-readable code comprising computer-readable instructions. The computer-readable instructions may be stored on a computer-readable storage medium, including a non-transitory computer-readable storage medium, such as a hard-disk or solid-state memory.

The invention claimed is:

1. A method for exporting sensitive information from an integrated circuit, the method comprising:
fabricating an integrated circuit, the integrated circuit having a register-transfer level "RTL" key fabricated in the integrated circuit, wherein the RTL key is a predetermined cryptographic key;
generating a signature by signing the sensitive information using the RTL key; and
exporting the signed sensitive information and the signature for validation;
wherein the sensitive information comprises at least two public keys each of a respective key pair of the integrated circuit to be exported for validation, wherein the integrated circuit comprises a hardware key generation value fabricated in the integrated circuit, and wherein the method further comprises:
generating at least two cryptographic key pairs, each pair comprising a public key and a private key, using the hardware key generation value, wherein the sensitive information comprises the public keys from the at least two cryptographic key pairs.

2. The method according to claim 1, wherein the sensitive information is device-specific sensitive information.

3. The method according to claim 1, wherein the RTL key is a predetermined cryptographic key unique to a hardware description language definition of the integrated circuit.

4. The method according to claim 1, wherein the integrated circuit comprises an integrated universal integrated circuit card (iUICC), and wherein the at least two signed public keys of the integrated circuit are exported to enable secure personalisation of the iUICC.

5. The method according to claim 1, wherein the RTL key is an AES key.

6. The method according to claim 1, wherein the hardware key generation value has been generated from a strong entropy source.

7. The method according to claim 6, wherein the entropy source is at least one of a Physical Unclonable Function "PUF" or a True Random Number Generation "TRNG" seed.

8. The method according to claim 1, wherein the at least two public keys are signed by the RTL key using AES-CMAC.

9. The method according to claim 1, further comprising providing the RTL key to enable the signed public key to be validated.

10. The method according to claim 1, wherein the at least two cryptographic key pairs comprise a first cryptographic key pair and a second cryptographic key pair, the first key pair for authentication and the second key pair for encryption.

11. An integrated circuit comprising, in hardware:
a register-transfer level "RTL" key, wherein the RTL key is a pre-determined cryptographic key fabricated in the integrated circuit; and
wherein the integrated circuit is configured to:

generate a signature by signing sensitive information using the RTL key; and export the signed sensitive information and the signature for validation;

wherein the sensitive information comprises at least two public keys each of a respective key pair of the integrated circuit to be exported for validation, and the integrated circuit further comprises a hardware key generation value fabricated in the integrated circuit and is configured to use the hardware key generation value to generate at least two cryptographic key pairs each comprising a public key and a private key, wherein the sensitive information comprises the public keys from the at least two cryptographic key pairs.

12. A method for validating at least two public keys exported of an integrated circuit, the method comprising:

receiving at least two signed public keys of a respective key pair exported from the integrated circuit, each of the public keys signed using a register-transfer level "RTL" key which is a pre-determined cryptographic key fabricated in the integrated circuit, and wherein each of the public keys are a public key of a respective key pair from among at least two cryptographic key pairs generated from a hardware key generation value fabricated in the integrated circuit;

validating the signed public keys using the RTL key; and storing the validated public keys to enable validation.

13. A method for providing sensitive information from a transmitting entity to an electronic device, the method comprising:

receiving from an electronic device a certificate of the transmitting entity signed by an authentication private key of the electronic device, and an authentication public key of the electronic device;

verifying the received authentication public key of the electronic device by comparing the received authentication public key to a list of valid authentication public keys, and using the verified authentication public key to validate the certificate;

in response to validating the certificate, signing sensitive information to be transmitted to the electronic device using an authentication private key of the transmitting entity to generate a signature;

encrypting the signature and the sensitive information with a public encryption key of the electronic device; and transmitting the encrypted signature and the encrypted sensitive information to the electronic device for verification of the signature and storage of the sensitive information in the electronic device.

14. A method for obtaining sensitive information at an electronic device from a transmitting entity, the method comprising:

transmitting from the electronic device an authentication public key of the electronic device and a certificate of the transmitting entity signed by an authentication private key of the electronic device;

upon verifying the authentication public key by comparison with a list of valid authentication public keys and validating the certificate, receiving from the transmitting entity an encrypted signature and encrypted sensitive information, wherein the encrypted signature is a signature of the sensitive information signed using an authentication private key of the transmitting entity and is encrypted with a public encryption key of the electronic device;

decrypting the encrypted signature and the encrypted sensitive information using a private encryption key of the electronic device;

verifying the decrypted signature using a transmitting entity certificate stored in the electronic device; and in response to verification of the signature, storing the decrypted sensitive information in the electronic device.

* * * * *